INVENTOR.
J.P. GREENING
BY Hudson and Young
ATTORNEYS

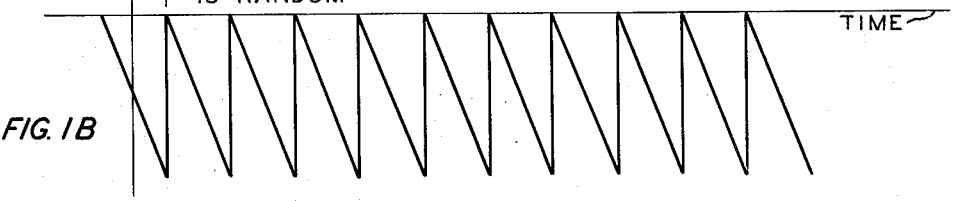
FIG. 1B
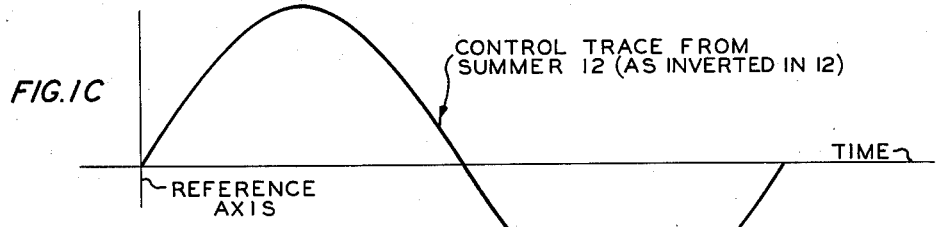
FIG. 1C
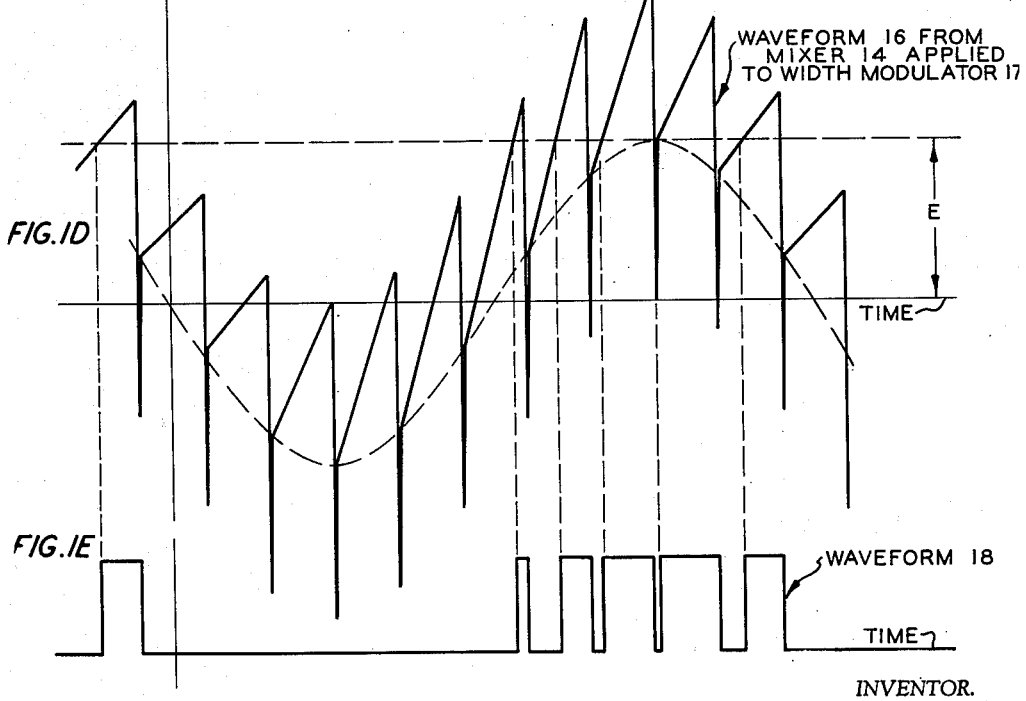
FIG. 1D
FIG. 1E
INVENTOR.
J. P. GREENING INVENTOR.
J. P. GREENING
BY Hudson and Young
ATTORNEYS May 1, 1962 J. P. GREENING 3,032,743
COHERENCE MEASURING CIRCUIT
Filed May 6, 1959 5 Sheets-Sheet 4

May 1, 1962   J. P. GREENING   3,032,743
COHERENCE MEASURING CIRCUIT
Filed May 6, 1959   5 Sheets-Sheet 5
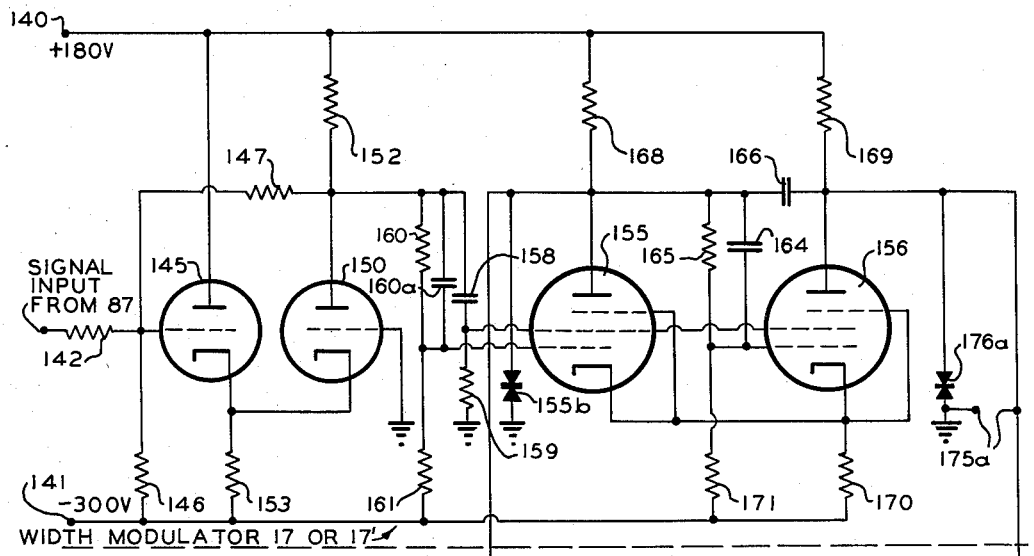
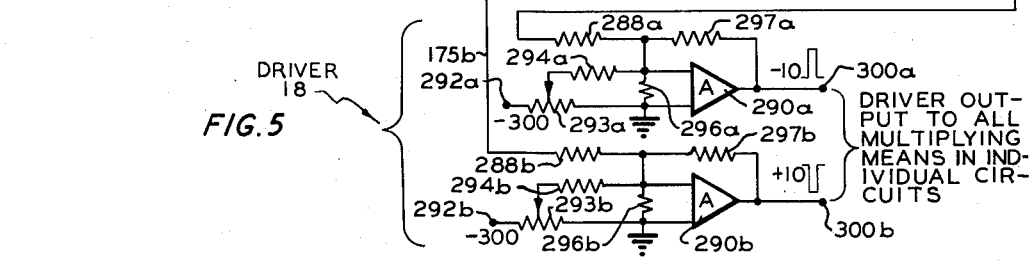
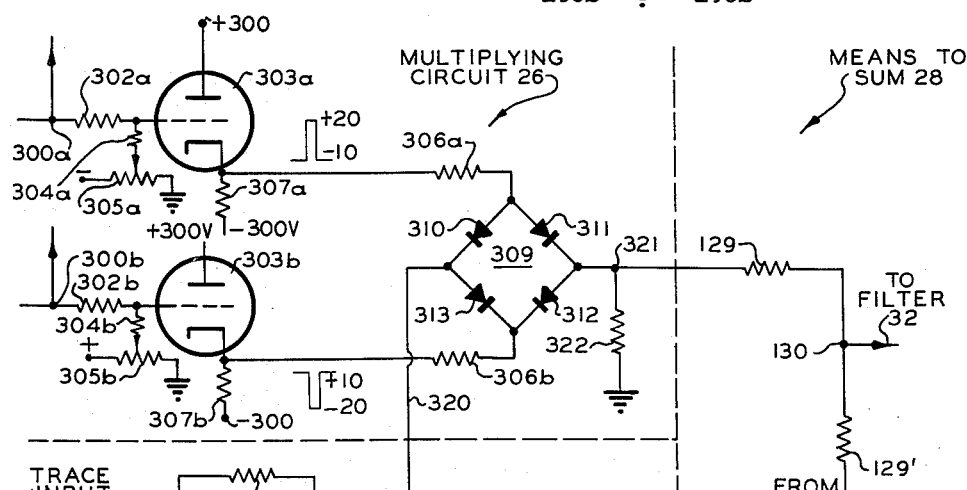
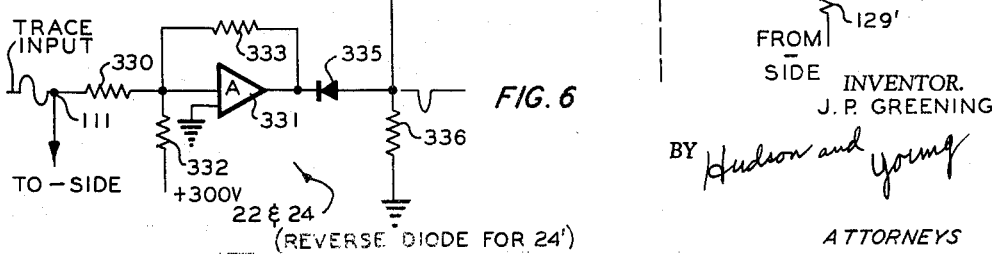
INVENTOR.
J. P. GREENING
BY Hudson and Young
ATTORNEYS United States Patent Office 3,032,743
Patented May 1, 1962

3,032,743
COHERENCE MEASURING CIRCUIT
John P. Greening, Bartlesville, Okla., assignor to Phillips Petroleum Company, a corporation of Delaware
Filed May 6, 1959, Ser. No. 811,367
10 Claims. (Cl. 340—15)

The instant invention relates to improvements in apparatus for detecting a seismic signal in the presence of noise.

Basically, the apparatus measures the similarity between a high quality seismic data trace and a lower quality seismic data trace by means of multiplication. The apparatus includes means for forming a high quality data trace by summing a number of lower quality traces after correction for the angularities of the respective signal paths. A plurality of stored, i.e. recorded, lower quality data traces comprises the original data. The apparatus is designed to take advantage of the fact that seismic signals of the nature to be treated here have a consistent phase relationship from trace to trace while phase of the noise component is random. By summing the individual traces, the random components cancel each other, wholly or in part, to provide the higher quality trace, i.e. a trace with less noise. The circuit is able to improve the signal to noise ratio by the incorporation therein of means to discriminate between in-phase and out-of-phase components, i.e., components within the lower quality trace which are in phase with the high quality seismic data trace. The degree of in-phase relationship may be termed coherence. The aforesaid multiplying function magnifies the in-phase relationship while at the same time diluting out-of-phase or noise signals. Thus, the output signal of the instant apparatus represents the product of the in-phase portions of both the high and low quality seismic data traces.

Accordingly it is an object of this invention to provide an improved means for detecting actual seismic signals in the presence of noise. An object is to include in such means apparatus for multiplying a high quality seismic trace by a lower quality seismic trace. Another object of this invention is to provide an improved means for forming such high quality and low quality traces preparatory to the operation of multiplying. Other objects and advantages will become apparent from the following disclosure, drawings and claims.

In the drawings:

FIGURE 1A shows schematically the arrangement of equipment;

FIGURES 1B, 1C, 1D, and 1E show the approximate wave forms produced in the apparatus of FIGURE 1A;

FIGURES 5 and 6 show another embodiment of the width modulator, driver, multiplier, and polarity circuit, respectively.

In the drawings, like numbers refer to like elements and primed numbers refer to similar elements which are slightly modified either as to structure or application.

*Overall Circuit Operation*

Figure 1A:
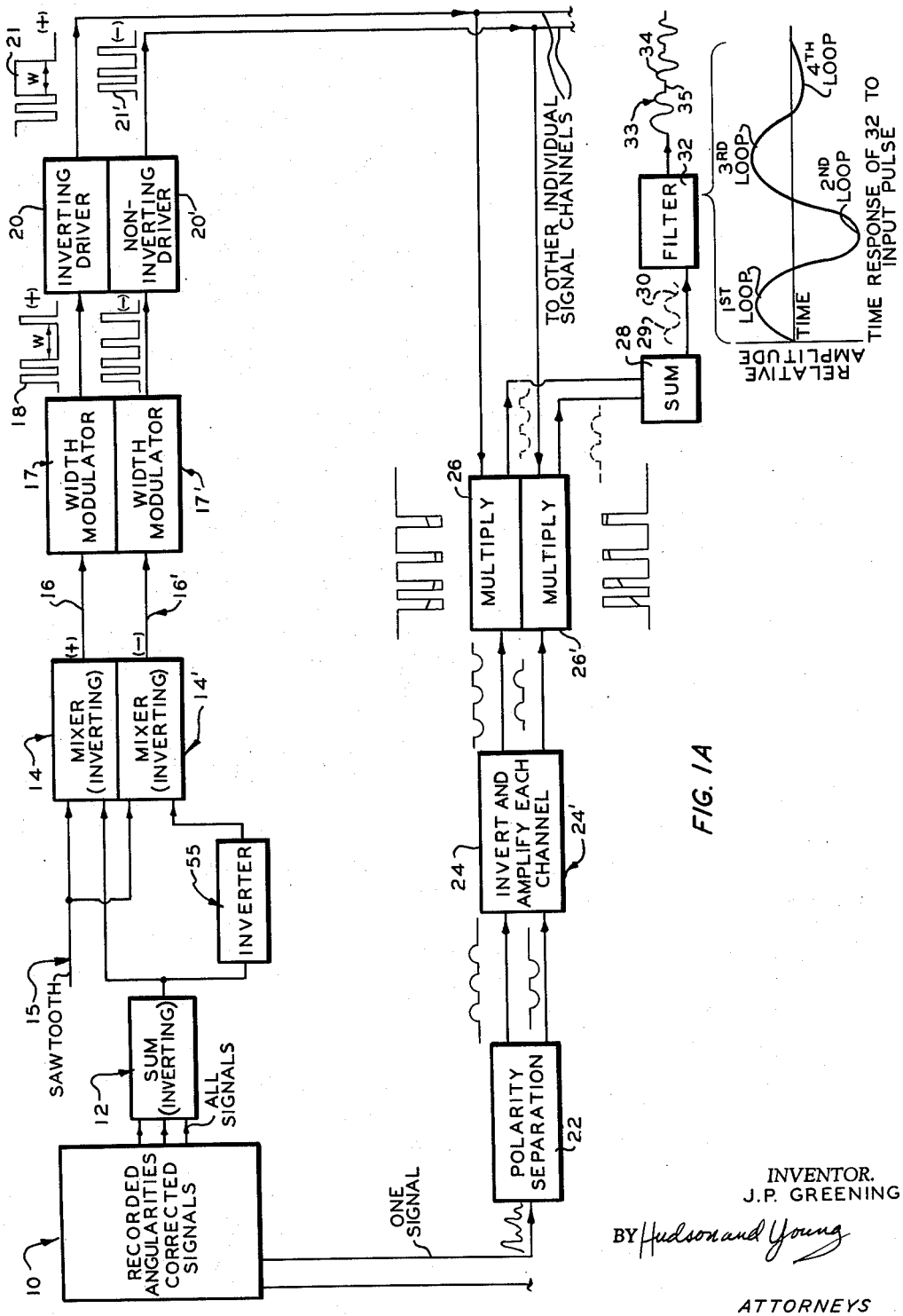

The details of FIGURE 1A will be described later. For understandability, the operation is described before the structure is. In FIGURE 1A there is shown a storage means 10 whereat a plurality of individual recorded, angularities-of-path-corrected signals are disposed. Storage means 10 may comprise a magnetic tape. The means for forming these signals into a high quality seismic data trace, hereinafter termed a control trace, will now be discussed. By angularities-of-path-corrected signals (hereinafter "angularities corrected"), I refer to those signals which have been so corrected that a given seismic event occurs at the same time when that event is withdrawn from two or more of the individual signals. The means for correcting such signals in this manner are well known in the art and need not be further discussed here. All of the signals are removed from storage and applied to a means for summing 12 to thereby form the control trace (FIGURE 1C). Subsequently described apparatus is necessary in order to prepare this trace for the multiplying operation.

The control trace that appears at the output of 12 is next applied to each of two channels in such manner that the control trave is divided into (+) and (—) polarity components. It is to be stressed and particularly noted hereinafter where I refer to a plus or minus polarity signal that is derived from this seismic data, that I refer to the polarity of the signal as it appears when drawn from the storage means 10, regardless of its actual polarity in subsequent apparatus and operations. This is is because the means for summing 12 and other apparatus each causes a phase inversion. So, for clarity, a plus (+) signal or channel (a channel for operating on a plus signal) refers to a signal as it appears in the storage means, and similarly for the opposite polarity. It should also be noted that the ultimate output signal of my complete apparatus—i.e., my coherence signal—is phase inverted from the input signal. It is not essential to correct this condition, but correction can be achieved by connecting an inverting amplifier to the output terminals of my invention. The polarity of the components of the control trace is determined in accordance with an arbitrarily selected zero. The same operations are performed on this control trace in each channel. Therefore, for the sake of brevity, only one channel—that operating on the positive polarity signal—will be described hereinafter. The negative polarity signals are operated on in that portion of the apparatus denoted by prime numbers in FIGURE 1 and in other figures. For the sake of providing uniform channel construction, the signal into the (—) channel is subjected to phase inversion in 55.

The control trace is next applied as one of the input signals to a mixer 14, which is really another means for summing and which also receives a negative-going second input (sawtooth) signal 15 (FIGURE 1B) and produces the waveform 16 (FIGURE 1D) as an output signal (14 is hereinafter described as the mixer in FIGURE 2). A sawtooth generator, hereinafter described, provides the signal 15 which is combined with the control trace in the mixer 14 to thereby produce the waveform 16. A negative-going sawtooth 15 is applied to both the plus and minus polarity channels because (a) mixers 14 and 14' include a phase inverting amplifier and (b) inverter 55 provides a control trace of correct phase for mixing with the sawtooth in the negative channel.

The waveforms 16 thus produced are next applied to first and second width modulators 17 and 17' wherein there is formed a time-series of pulses 18 (FIGURE 1E), the spacings of which are a function of, and loosely speaking may be said to be representative of, the successively occurring amplitudes of the respective polarity component of the control trace. The spikes of the waveform shown in FIGURE 1D are necessary to switch the width modulator 17 from one state to another. The width modulator 17 (also 17') is essentially a flip-flop which is adjusted to change state upon the application to the input terminal thereof of a voltage equal to E (as shown in FIGURE 1D) and to subsequently change state after that event only upon the input signal going to zero. Changes in the region from zero to E volts produces no change of state. The switching function upon the application of voltage E occurs whether the voltage is equal or greater than E. The spikes of FIGURE 1D consume a time interval of about 1 percent of the total duration of 1 sawtooth cycle (1000 microseconds). The output signal of the width modulator has the waveform 18 as shown in FIGURE 1E. It should be apparent from comparing FIGURE 1D with 1E that the width modulator also performs a polarity separating function because no width modulator signals are produced by the negative portion of the control trace (speaking with reference to the negative portion of FIGURE 1D) by reason of the inability of the mixed signal to achieve a voltage amplitude of equal to or greater than E. It should be understood that the summing circuit 12 and mixer 14 both include an inverting amplifier and therefore the inversion that takes place in the mixer 14 merely returns the control trace component to its original polarity as derived from the original signals drawn from 10.

The sawtooth signal thus serves to "sample" the amplitudes of the control trace. As is evident from FIGURE 1D, there is some non-symmetry in the sampling, by reason of the shape of the sawteeth. This is reduced to a negligible effect by increasing the sawtooth frequency, hence the sampling frequency. Hereinafter, when I use the term "sample" or "sampling" I refer to the technique of causing a circuit to change state by applying thereto a compound waveform made up of plural waveforms neither one of which is capable of producing a stable change of state by itself.

Each respective series of pulses (waveform 18) is then applied to a power stage 20, hereinafter termed a driver. One of the principal reasons for supplying the drivers 20 and 20′ is to provide sufficient power so that the wave trains 21 and 21′, respectively, formed therein can be applied to a plurality of individual channels, thereby to be compared, i.e., multiplied by the individual seismic traces operated on in each individual channel. Moreover, it is to be noted that the output signals 21, 21′ from the driver (and width modulator too) have various spacings W, each of which are representative of an amplitude of the control trace produced in the means for summing 12. The reason that two channels are provided for producing these time spaced pulses is so that signals of different polarities can be multiplied by them.

The above ends this portion of the description of the common equipment of the instant invention. This equipment provides a control trace which is compared by multiplication with each individual seismic data trace in an individual subsequent circuit. One of these subsequent circuits is next described. It is understood that a plurality of these individual circuits is provided and that, preferably they are all constructed in like manner.

*The Individual Circuits, Function*

Still referring to FIGURE 1, a signal representing a lower quality seismic data trace is removed from storage 10 and applied to a means, 22, for separating such trace into its positive and negative polarity components. From this point on there is a separate channel provided for the components of each polarity. These components are next applied to an inverting amplifier and a clamp circuit in combination 24 and 24′ (representing each channel respectively. The clamp circuits operate to pass only those signals having a certain amplitude or greater. Such signals as are passed are applied to multiplying circuits 26 and 26′ where they multiply the time spaced signals 21 or 21′, as the case may be. The output signals from the multipliers are then applied to a fourth means for summing, 28.

The output signal from the means for summing has the general appearance of signal 29. As noted on the drawing, it is of broken line form and the positive and negative components have discontinuities 30 where they come together. In some instances (e.g. where 30 is small) the signal 29 may comprise a usable form of output signal. However, it is generally desired to form a continuous signal having discontinuities 30 removed, if possible. To this end, a filter 32 is provided. The output signal from the filter 32 is of the general form 33 having seismic events 34 clearly shown thereon and segments 35 which represent those areas where noise has been eliminated.

It should be noted at this point that the filter 32 may be a band pass RC active filter or a LRC passive filter of a general type well-known to those in the electronic art. Experience has shown that a filter which has a time response to an impulse input such as shown for 32 in FIGURE 1A, wherein the first and third loops are as equal as possible and the fourth loop is as small as possible, is satisfactory. A network having two zeros and four poles, and a transfer function of form $$F_{(s)} = \frac{K_1}{S^2 + 2\alpha S + \alpha^2 + \beta_1^2} \cdot \frac{K_2 S^2}{S^2 + 2\alpha S + \alpha^2 + \beta_2^2}$$

where $K_1$ and $K_2$ are gain constants, S is the complex frequency variable, and $\alpha$, $\beta_1$ and $\beta_2$ are design constants to locate the poles, has been found experimentally to have approximately such a response. For the frequency range at hand, $\alpha$ of 115, $\beta_1$ of 82 and $\beta_2$ of 295 are the pole locations, and it is only necessary to synthesize the functions $$\frac{K_1}{S^2 + 230S + 20,000} \text{ and } \frac{K_2 S^2}{S^2 + 230S + 100,000}$$

This is done according to the method of Sallen and Key, IRE Trans. on Circuit Theory, March 1955, pp. 74–85, wherein a network of type 1 is used for the first function and one of type 3 for the second, and the procedure of page 81 is followed.

*Storage Means 10*

Figure 2:
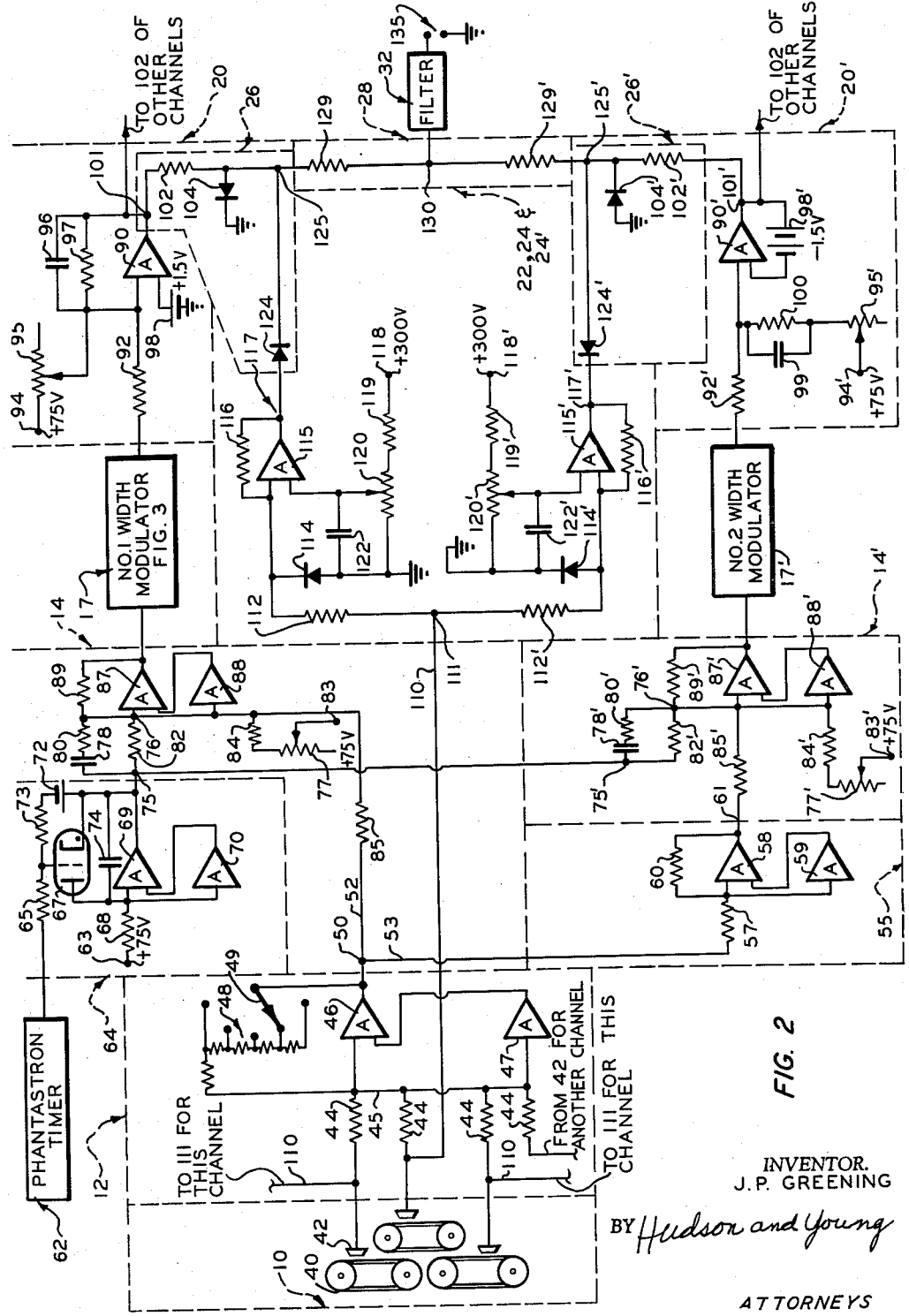
FIGURE 2 shows schematically the electronic circuits of one embodiment of the instant invention.

Referring now to FIGURE 2 there are shown the details of the various elements 10 through 28 as have been broadly described above with respect to FIGURE 1. The means for storing 10 may comprise a plurality of magnetic tapes and driving means, 40, associated with appropriate pickup and transducing means 42. Each individual assembly of 40 and 42 comprises one storage channel for a single seismic trace. In the embodiment shown, only three seismic traces and storage means therefore are shown, however, it is to be understood that as many such traces and storage means can be used as is desired. Alternatively, a plurality of seismic traces may be stored on one means 40, and one pickup means 42 for each channel provided.

*Summing Means 12*

The signal from each pickup 42 is fed across a summing resistor 44 to a common lead 45. One resistor 44 is provided for each individual seismic trace and all of 44 are of equal resistance, in accordance with the convention for summing circuits of this nature. The lead 45 connects the summing resistors to one input of a phase-inverting amplifier 46 and to one input of a drift stabilizing amplifier 47, the output of which is connected to the other input of amplifier 46. A feedback circuit around amplifier 46 includes a plurality of resistors 48. The resistance of the feedback circuit is varied by moving arm 49 to various contact points to select a resistance 48 appropriate to the number of seismic traces being summed.

The summed signal appears at the junction 50, from whence it is fed through leads 52 and 53 into respective channels of the common circuit. As shown in FIGURE 1, the signals are first fed into the mixer. However, since the reason for providing a second channel from lead 53 is to effect a polarity separation, an inverting circuit 55 is connected to lead 53. The inverter permits the sawtooth signal to operate on the negative polarity portions of the control trace which appears at the junction 50.

Inverter 55 comprises a resistor 57 at the input thereof, which is connected to one input of a phase inverting amplifier 58 and to one input of a drift stabilizing amplifier 59, the output of the latter being connected to the other input of the inverting amplifier. A feedback circuit through resistor 60 completes the inverting circuit.

The Mixer 14 and Sawtooth Generator 64

The phase inverted signal from 55 is fed into lead 61, which constitutes the input to the mixer 14′ for this channel. In like manner, the signal from 52 is fed into the mixer 14. Before going further, it is necessary to describe in part the equipment associated with the mixers 14 and 14′ which generates certain timing signals. A phantastron timer 62 feeds a series of pulses equally spaced in time to the input of a sawtooth generator 64. These pulses cause the sawtooth generator to produce the waveform 15. The operation of the phantastron will not be described in greater detail in this application, but a description of this type of apparatus and its theory may be found in the April 1948 issue of Electronics, page 101. The exact structure of the phantastron is disclosed here in FIGURE 4.

The sawtooth generator 64 comprises an input resistor 65 connected to the control grid of a gas-filled triode 67. The anode of the gas-filled triode is connected to a positive terminal 63 via resistor 68 and to a first input of an amplifier 69 which is drift stabilized by amplifier 70. The triode is connected from its grid across resistor 73 to a battery 72, the plus terminal of 72 being connected to the output of amplifier 69 which is also connected to the cathode of 67. A capacitor 74 is in parallel with the anode-cathode circuit of 67.

To simplify the explanation hereof, only one channel of this portion will be described, the other channel having like elements (as denoted by primed numbers) which perform the same function on that portion of the control trace which is of opposite polarity. In the embodiment presented, the channel through width modulator No. 1 is for the positive polarity signals (referred to input of 12) and the channel through the width modulator No. 2 is for negative polarity signals (same reference). Both channels receive signals from the summer 12 and the sawtooth generator, and each performs like operations on its respective input signal.

Generation of special waveforms to operate the width modulators 17 and 17′ is accomplished by summing the control trace with the sawtooth signal from 64 and with a bias signal from another source, described below. The effect of such summing is to produce signals such as 16 (FIGURE 1D).

The junction 75, where the sawtooth signals appear, is connected to the summing junction 76 by the circuit that includes capacitor 78, resistor 80 and resistor 82. Elements 78 and 80 serve to produce the strong vertical spikes evident in waveforms 16 in FIGURE 1D. These spikes cause the width modulator to always switch to the negative state for all values of control trace amplitude that are within the range of the modulator.

A source of D.C. potential, 83 feeds across summing resistors 84 and 77 into the summing junction 76. Likewise, the control trace is fed across summing resistor 85 into the summing junction. A summing amplifier 87 receives the signal from the junction 76. A drift stabilizing amplifier 88 is associated with 87. A feedback circuit through resistor 89 is provided around amplifier 87. With the control trace on lead 52 adjusted to zero amplitude, an adjustment is made of 77 so that the pulse width out of 17 is zero or very nearly so (not greater than 10 microseconds).

Width Modulator, Function

The width modulator comprises a flip-flop, that is a circuit that works from either one or the other of its limits according to the magnitude of the signal applied to the input terminal. Specifically, the width modulator involved is a device which will change its state from one limit to the other limit when the equation $$f(t)+kt+C=E$$

is satisfied. In the stated equation $f(t)$ is the control trace, $kt$ is the linear sawtooth, $C$ is the bias signal (derived from the adjustment of 77), and $E$ is the modulator threshold voltage as illustrated in FIGURE 1D.

The output signal from the summing amplifier 87 is of the sine waveform with superimposed sawtooth plus impulse (or spike) as shown in FIGURE 1D at 16. The width modulator 17 in each channel receives signal 16 and produces therefrom the varied width square wave type wave trains 18 as shown in FIGURE 1E. The construction of the width modulator 17 will be described below with respect to FIGURE 3. The output from the width modulator is then applied to the inverting driver 20 in one channel and to a non-inverting driver 20′ in the other channel.

Drivers 20, 20′

Both drivers have an input resistor 92, a source of D.C. bias 94, and adjustable resistor 95 all connected to one input of the amplifier 90. In the inverting driver 20 a feedback circuit comprising parallel connected capacitor 96 and resistor 97 connects to the same amplifier input terminal as do elements 92 and 94. The other input of the amplifier is connected to ground through a 1.5 volt battery 98. By contrast, the non-inverting driver 20′ has a feedback circuit to another input of the amplifier that includes the 1.5 volt battery 98′. In addition, driver 20′ has an RC filter comprising resistor 100 and capacitor 99 connected in parallel between 95′ and 92′.

The reason for the drivers is that the respective wave trains therefrom, 21 and 21′ as shown in FIGURE 1, are provided to a plurality of channels. In each of such channels a multiplication takes place between the control trace as represented by 21 and 21′ and a seismic trace. The driver supplies the power to the control trace so that it may effectively operate on a large number of individual channels. Moreover, the drivers perform the proper type of inversion so that the output signals therefrom are the proper polarity for feeding to the multiplying circuit. One such individual channel will now be described. It is to be understood that a plurality of such channels such as designated by numerals 22, 24 and 24′, 26 and 26′, 28 and 32 are to be provided.

The Individual Channel Through 22 and 24

The second circuit, which comprises a means for receiving one of a plurality of seismic traces, for separating it into polarity components, amplifying and inverting the respective polarity separated components, multiplying these amplified signals by the respective width-modulated signals obtained from drivers 20 and 21, recombining these multiplied polarity-separated signals into a single signal, and filtering so as to remove the square-wave modulation, is made up of components 22, 24 and 24′, 26 and 26′, 28 and 32.

The above described configuration provides a means for amplifying the polarity separated components. The polarity separated component is applied to diode 124, the opposite terminal of which is connected through resistance 102 to the output 101 of driver 20. Components 124 and 102, with diode 104, comprise the multiplying circuit 26 of FIGURE 1.

The particular seismic trace is fed into the circuit from storage means 10 through lead 110. At junction 111 the circuit splits into the respective channels for polarity separation as previously mentioned. The signal then goes across resistor 112 to a junction with rectifier 114, the latter in this case being a diode appropriately poled for removing signals of either ± polarity, as the case may be. The polarity separator 22 comprises 112 and 114. The signals then pass into a low impedance inverting amplifier 115. The output from 115 is fed back to this input terminal through resistor 116. The other input terminal of the amplifier output receives a D.C. signal from terminal 118 that has been applied across resistor 119 and adjustable resistor 120. A portion of the resistor 120 is in parallel with the capacitor 122 and is connected to the ground terminal of the rectifier 114.

The above described configuration produces a multiplier signal which is then applied to the multiplier 26, or 26' as the case may be. As explained above, after multiplication the signals from each channel are combined to produce a coherence measurement having positive and negative polarity components. This coherence measurement is then filtered to smooth out the signal thus obtained.

The Multiplier 26

The multiplier 26 comprises the diode 124 which connects to a junction 125. The junction 125 is connected to ground by another diode 104. A resistor 102 completes the circuit by feeding signals drawn from junction 101 of the driver output past one terminal of the diode 104 and into the junction 125. It should be noted that the diodes 124 and 124' are oppositely poled.

The operation of the multiplier is as follows:

Multiplication of the pulse wave form of constant amplitude but variable width, which appears on terminal 101, by the polarity separated component which appears at terminal 117, is accomplished in this amplitude selection circuit, its characteristic being such that when the voltage at 101 is less than that at 117, the voltage at 125 will be the same as that at 101, while if the voltage at 101 is greater than that at 117, the voltage at 125 will be the same as that at 117. The result of this operation is such that the train of pulses at 101 appears at 125 with the envelope of the polarity separated signal thereon superimposed. The area of these pulses, the height of which represent the individual channel trace, and the width of which represent the control trace, represents the product of these signals. It should be understood that the unprimed circuits operate together, and likewise the primed circuits. As should be evident from FIGURE 1, the output signal from the multipliers 26 and 26' are of a dotted line type. They also are of opposite polarity. That is, they represent opposite polarity components of one seismic trace coherence measurement. In order to form a complete seismic trace, one having both polarity components, the signals are next fed to a summing circuit 28. The summing circuit comprises resistors 129 and 129' connected in series with each multiplier 26, 26' and a summing junction 130 which is common to both channels.

As indicated in FIGURE 1, the output from the summing circuit 28 is still of a dotted line configuration and there may be imperfect joining of the ± portions of the coherence measurement. In order to smooth out the signal, it is next filtered in filter 32. The transfer characteristics and the like are stated above for the filter. Ultimately, an output signal such as shown at 33 in FIGURE 1 is achieved. Since the action of the equipment is such that a maximum signal will be obtained at 135 when the individual channel trace is exactly in phase with the control trace, and a zero signal when the signals are 180° out of phase, the output is a measure of the "coherence" between the two signals. This is substantially noise free in areas where no seismic events are recorded (as at 35) and emphasizes true seismic events such as at 34. This output signal appears at the terminals 135 in FIGURE 2. In the embodiment shown it appears between one terminal and ground.

Width Modulator Construction

Figure 3:
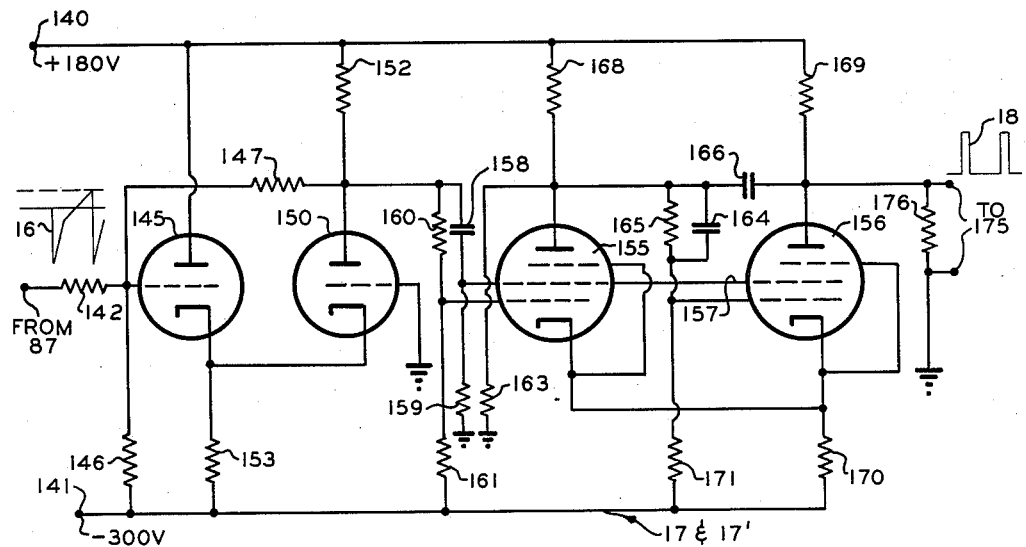
FIGURE 3 shows the width modulator of FIGURE 2.

FIGURE 3 shows the construction of a preferred type of width modulator 17, 17'. In substance, this circuit comprises a flip flop, i.e., a multivibrator that works from either one or the other of its limits according to the magnitude of the signal received from the output of amplifier 87. Direct current power is supplied in the form of plate voltage from terminal 140 and in the form of cathode bias from terminal 141. The signal from 87 is applied across resistor 142 to the control grid of a triode 145. The grid is also connected to 141 across resistor 146. The grid is likewise connected across resistor 147 to the plate of triode 150 which receives plate voltage across resistor 152 and has a grounded control grid. The cathodes of 145 and 150 are connected together and have a common connection across resistor 153 to 141.

The plate of 150 is also connected into a circuit that includes two pentodes, 155 and 156. In each pentode the cathode is connected to the suppressor grid. The screen grids of both pentodes are connected by lead 157. The screen grid of 155 is connected through capacitor 158 to the plate of 150 and is also connected to ground across the resistor 159. The control grid of 155 is connected to the plate of 150 across resistor 160 and also to the negative terminal 141 across resistor 161. The plate of 155 is connected to ground across resistor 163 and is coupled through an RC filter to the control grid of 156. The filter comprises parallel-connected capacitor 164 and resistor 165. The plate of 155 is also connected to the plate of 156 through capacitor 166. Plate voltage is supplied to the pentodes across resistors 168 and 169, respectively. The cathodes of the pentodes are connected together and in turn are biased across resistor 170 from the terminal 141. The control grid of pentode 156 is also connected to 141 across resistor 171. The output signal from the width modulator appears across terminals 175 which are connected to the plate of 156. The terminals are isolated from each other by a resistor 176.

Phantastron Construction

Figure 4:
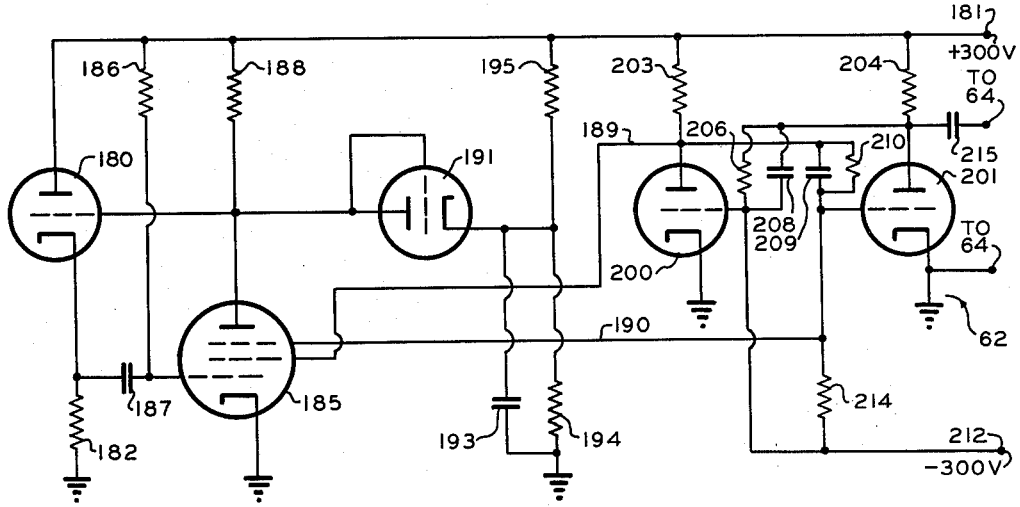
FIGURE 4 shows a preferred form of phantastron as employed in FIGURE 1A.

FIGURE 4 shows the phantastron pulse generator which feeds signals to the sawtooth generator 64 of FIGURE 2. This is a sort of precision multivibrator, the theory of operation of which is explained in the reference to Electronics, supra. This assembly comprises a triode 180 receiving positive plate voltage from a terminal 181. The cathode of 180 is connected to ground across a resistor 182, and the control grid thereof is connected to the plate of a pentode 185. The control grid of 185 is connected to 181 across resistor 186 and to the cathode of 180 across capacitor 187. Plate voltage is supplied to 185 across resistor 188. The screen and suppressor grids of the pentode are connected to what is substantially a multivibrator circuit by means of leads 189 and 190, respectively. The plate of the pentode is connected to ground via a diode 191 and an RC filter comprising capacitor 193 and resistor 194. The filter is connected to 181 across resistor 195.

A multivibrator circuit comprising triodes 200 and 201, receiving their plate voltage from 181 across resistors 203 and 204, respectively, is now described. The cathodes of both triodes are connected to ground, and the cathode of triode 201 is also connected to one output terminal. The control grid of triode 200 is connected to the plate of triode 201 through resistor 206 connected in parallel to capacitor 208; triode 201 is connected in like manner to 200 through resistor 210 and capacitor 209. The control grid of 201 is connected to a source of negative potential 212 across resistor 214. The plate of 201 is connected to one of the output terminals across capacitor 215. The output from this circuit is then applied to the sawtooth generator 64, which is more fully described above with respect to FIGURE 2.

The Preferred Embodiments of the Width Modulator, Driver, Multiplier, and Polarity Circuit (FIGURES 5 and 6)

FIGURES 5 and 6 show other embodiments of the width modulator, driver, multiplier, and polarity circuit. The preferred embodiment of the invention incorporates the circuit shown in FIGURES 5 and 6. By and large, the function of these circuits is quite similar to those described above. The advantage of employing the circuits of FIGURES 5 and 6, which should always be used together, is that they can succcessfully operate on more individual traces than can the related circuits of FIGURES 2 and 3. The apparatus of FIGURES 5 and 6 is suitable for processing either single traces or a plurality of traces, in an actual embodiment having been successfully used to process up to 24 different traces simultaneously.

The principal difference in mode of operation in the apparatus of FIGURES 5 and 6 is that the width modulator has two pairs of output terminals, thus providing two different output signals. The reasons for this is that an empirical zero value is imposed on the input signal to this modulator in order to cause it to produce two simultaneously occurring output signals of opposite polarity. Each of these output signals then travels through a different channel in the driver until it reaches the multiplier, which is of different structure to accommodate the reception of plural signals from the width modulator and driver. The driver, of course, has individual channels therein for applying the appropriate amount of power amplification to the signals received from the width modulator. To avoid confusion of the term "channel" with that as used elsewhere, I will hereinafter refer to the different channels through the driver as "subchannels."

To facilitate an understanding of this embodiment, parts which have already been described and remain the same will not be further described, but only differences in structure will be described. To summarize the changes in structure: the width modulator now has two pairs of output terminals, 175a and 175b, and also has disposed between each individual pair of output terminals a double ended Zener diode such as 155b and 176a which constitutes a means to regulate the voltage; the driver has two subchannels, each one of which is connected to one of the respective sets of terminals 175a and 175b of the width modulator (because there is substantial difference in structure in the driver, it will be further described in much greater detail below); the multiplier circuit comprises a diode gate circuit, as shown in FIGURE 6; and finally in the polarity circuit the poled diodes for discriminating between ± signals have been moved to the output of the amplifier.

FIGURE 5 shows the details of the width modulator and driver 18. As noted above, the width modulator has two sets of output terminals from each of which is drawn a signal of a particular polarity and of an amplitude related to ground. The double ended Zener diode serves to regulate the voltage amplitude as it appears at the respective terminals. One other change in the width modulator is the addition of capacitor 160a in parallel with the resistor 160. It is to be understood that the width modulator for each channel is constructed in accordance with FIGURE 5, as is true of the driver shown in that figure.

Each subchannel of the driver is similarly constructed. It is understood of course, that the driver in the other channel of the common equipment for processing the high quality trace is constructed in a like manner and also has two subchannels therein for processing the signals drawn from the width modulator of that channel. To differentiate between elements for one subchannel and the other in a single driver, reference numerals incorporating the letters "a" and "b" will be employed in the drawings. Only one of the subchannels will be described, it being understood that the other subchannel is of like construction, the description of the second channel being derived by substituting "b" for "a" wherever the latter appears in the following description.

The signal drawn from the terminals 175a is applied across the resistor 288a to the first input of an amplifier 290a. A negative bias drawn from terminal 292a is applied across the potentiometer 293a, drawn from the contactor of the latter and applied across resistor 294a to the said first terminal. The first terminal is also connected to the second input of the amplifier 290a and to ground across resistor 296a. The second input terminal is connected to the other end of the impedance element of the potentiometer 293a. A feedback circuit through resistor 297a connects to a junction between the resistors 288a and 296a. The output signal from this subchannel appears at the terminal 300a, from whence it is applied to the multiplying means. The signal appearing at the terminal 300a is between +20 and −10 volts, while the signal appearing at terminal 300b is between −20 and +10 volts.

The signal appearing at the terminals 300a and 300b is next applied to one or a plurality of the multiplying circuit(s). The signal from the driver subchannel is first fed through an isolating amplifier 303a, which for the sake of convenience is considered as part of the multiplier, principally because such amplifier is not common equipment, as this term is used above to refer to the apparatus for processing the high quality signal.

Referring to the path of the signal drawn from the subchannel having terminal 300a, as seen in FIGURE 6, the signal is applied across a resistor 302a to the control grid of a cathode follower, triode 303a. The control grid is also connected by a resistor 304a and potentiometer 305a to a source of negative bias (the "b" subchannel is connected to a positive bias across 304b and 305b). The anode of the triode is connected to a source of positive bias, as shown +300 volts. The output signal appears at the cathode of the triode and is drawn from there to be applied across the resistor 306a to the mufltiplying circuit which comprises a diode gate. A resistor 307a connects the output lead from the cathode to a source of negative bias. The signal appearing at the cathode of the tube 303a extends from −10 volts to +20 volts, while the signal appearing at the cathode of triode 303b extends between −20 volts and +10 volts.

The signals from the respective subchannels of the driver, after passing through the isolating amplifier, are then applied to the multiplier 26 which in this embodiment comprises the diode gate circuit 309. As shown, the gate circuit comprises four series connected diodes 310, 311, 312, and 313 which are poled in such a manner as to flow a positive signal from the "a" subchannel to the "b" subchannel. The signals from the respective subchannels are applied to a first pair of opposite terminals which are disposed, respectively, between diodes 310 and 311 and between diodes 312 and 313.

The individual trace, after polarity separation, phase inversion, and amplification in the circuits comprising 22 and 24, is applied to the multiplier through lead 320 to the terminal between diodes 310 and 313. The diode gate thereby combines the pulse signals from the respective subchannels of the driver with the polarity signal from the individual channel 22 and 24, i.e., elements 111, 330 through 336, and 320 as seen in FIGURE 6. The output signal is of the one polarity dotted line type described with respect to FIGURE 1A, which output signal is drawn from the circuit at terminal 321. The output terminal 321 is connected to ground via resistor 322.

The output signal from the multiplying circuit 26 is then applied to the means to sum 28 which in this instance comprises the resistance 129 connected to a junction 130. The dotted line signals of opposite polarity are drawn from the other channel of the equipment (i.e. from the output of multiplier 26') through resistor 129'. The sum of these two signals then appears at the junction 130 and is subsequently filtered, if necessary, in the filter 32.

Still referring to FIGURE 6, the polarity separation circuit 22 and the inverting amplifier circuit 24 for the positive polarity (referred to input) channel is now described. It is to be understood that the negative polarity channel is constructed in like manner with the exception that the diode connected to the amplifier output is poled oppositely in order to pass only the positive signals. The individual seismic trace appears at the junction 111 (which is the same junction as shown in FIGURE 2) from whence it is applied across the resistor 330 to a first input of the amplifier 331. A source of positive bias is connected to this same terminal across resistor 332. Similarly a feed back resistor 333 connects the output to this terminal. The other terminal of this amplifier is grounded. A diode 335 is connected to the output of the amplifier. In the embodiment shown in FIGURE 6, the diode is poled to pass only negative signals (representing the + as appearing at the output of 12, FIGURE 1A, because of phase inversion in 331) from the amplifier output. As mentioned previously in this paragraph, the diode 335 would be oppositely poled in the other channel (the channel for processing the negative components of the individual seismic signal). The other terminal of the diode is connected by the lead 320 to the diode gate 309. The lead 320 is also connected to the ground by a resistor 336.

The operation of the embodiments of FIGURES 5 and 6, as previously stated, requires that all of the components of FIGURES 5 and 6 be used together in the circuit of FIGURE 1A. It is to be understood, of course, that the storage 10, the means for summing 12, and the mixing circuit 14 are constructed as previously set forth with respect to FIGURES 1A and 2. The operation is believed to be apparent from the previous disclosure, namely that the width modulator receives the output signal from amplifier 87 (the output of the mixer 14) and processes it to form first and second width modulator output signals which appear at output terminals 175a and 175b. The signals at these output terminals are, theoretically and ideally, of equal amplitude but of opposite phase, i.e., the square wave pulses derived at the respective output terminals are completely out of phase, occur at the same time on a time base, and are of equal amplitude. These respective output signals then receive the requisite power amplification in the driver (in their individual subchannels), are drawn from the driver, pass through an isolating amplifier, and then are applied to the diode gate where the multiplying function is carried out. This process is repeated for signals of the opposite polarity that are traveling through the other channel of the common equipment as shown in FIGURE 1A. The signals of the two channels are brought together and summed at the junction 130, and thereafter are filtered if necessary to smooth out any discontinuities.

It should be evident from the foregoing that I have provided an improved coherence measuring circuit to remove noise from seismic signals. The instant invention provides a circuit with a minimum of components. It includes a means for forming a control trace from a plurality of simultaneously occurring individual seismic traces. This is done by summing such seismic traces together in order to cause the noise components thereof which are out of phase to cancel each other out. This latter is a phenomenon well known in the seismic art. It takes advantage of the fact that noise signals are of random phase relationship and helps to emphasize the fact that seismic signals have a consistent phase relationship from trace to trace. Ordinarily, the more such seismic signals which are summed together, the more noise free the control trace is. Also, the greater the signal to noise ratio, the better the end result is.

By providing separate channels from those portions of the signal of different polarity, and by dividing the seismic trace or control trace themselves, respectively, into signals of different polarity components it is possible to remove noise signals from the seismic traces fed into the second circuit, i.e., 22, 24 and 24'.

The output signal from the instant circuit, that which appears at 135, is a "coherence measurement." This refers to a time function whose envelope magnitude at any instant of time represents the degree of coherence of the two time functions being measured. In other words, it represents the amount of in-phase relationship between a selected seismic trace and a control trace applied thereto. Such a coherence measurement emphasizes the in-phase relationships, especially when it is realized that the instant circuit multiplies the in-phase relationships. The two signals may be said to be completely incoherent when their phase relationship is 180° (when one is the negative of the other). On the other hand if the control trace and the selected seismic trace are of the same frequency they will be found to be completely coherent when they are exactly in phase. It is to be noted that the input signals to the instant circuit comprise only those signals which have had all time corrections, i.e., corrections for moveout, angularity of path, and difference in path length, made.

In one specific embodiment, which has been made and operated, the circuit elements were as follows:

| Element No. | Size and/or Description |
|---|---|
| | Common Equipment |
| 44 | 1.2 MΩ. |
| 48 | 2.2 to 30KΩ in 24 graduated steps. |
| 46, 58, 69, 87, 115 | Phase inverting operational amplifier such as Philbrick Model K2-W, described in "Applications Manual for Philbrick Computing Amplifiers," published, G. A. Philbrick, 1956 (hereinafter "manual"). |
| all stabilizing amplifiers | Gain: 1,000 D.C.; chopper; 2 megohms D.C. input impedance; 22 megohms and 1 mf. output impedance; such as Model K2-P in said manual. |
| 85 and resistor 61 | 50,000 ohms. |
| 57 | 70,000 ohms. |
| 60 | 60,000 ohms. |
| 92, 92' | 150,000 ohms. |
| 83, 83' | 25,000 ohms. |
| 84, 84' | 400,000 ohms. |
| 80, 80' | 51,000 ohms. |
| 82, 82' | 250,000 ohms. |
| 73, 89, 89', 95, 95' | 100,000 ohms. |
| 67 | 6Q 5G. |
| 78, 78' | 33 mmf. |
| 74 | .01 mf. |
| 65 | 75,000 ohms. |
| 96, 99 | 10 mmf. |
| 97, 100 | 510,000 ohms. |
| 90, 90' | 30,000 D.C. open loop gain; ±50 v. D.C. input voltage; ±100 v. D.C. output voltage; operational, phase inverting such as Model K-2X in said "manual". |
| 102 | 200,000 ohms. |
| | Individual Channels |
| 112 | 200,000 ohms. |
| 104, 114, 124, 124' | DR 385. |
| 116 | 500,000 ohms. |
| 288, 294, 297, a and b of each | 150,000 ohms. |
| 119 | 2.5M ohms. |
| 176a, 155b | IN 227. |
| 290a, 290b | Phase inverting, operational amplifier such as Model K2-X in said "manual." |

While I have described my invention with respect to a certain embodiment and with respect to certain circuitry, it is not my intention to be limited thereto but to include as my invention all the equivalents of such embodiments as shown, described, and claimed.

I claim:

1. Apparatus for measuring coherence between seismic signals comprising means to sum a plurality of seismic signals to establish a first signal; first and second summing means; a sawtooth generator; means connecting the output of said means to sum and the output of said generator to the inputs of said first summing means; a signal inverter; means connecting the output of said means to sum to an input of said second summing means through said signal inverter; means connecting the output of said generator to an input of said second summing means; first and second pulse width modulators; means connecting the outputs of said first and second summing means to the inputs of said first and second modulators, respectively; first and second signal multiplying means; means to divide a seismic signal into positive and negative components; means connecting the positive output components of said means to divide and the output of said first modulator to the respective inputs of said first multiplying means; means connecting the negative output components of said means to divide and the output of said second modulator to the respective inputs of said second multiplying means; and means to sum the outputs of said first and second multiplying means.

2. A circuit according to claim 1 wherein said first and second width modulators each comprises a flip-flop circuit that responds to reception of an input signal of predetermined maximum amplitude to produce a square wave pulse of predetermined first amplitude that continues at said first amplitude until the input signal is a predetermined minimum amplitude, at which time said flip-flop circuit changes state to produce a signal of the same amplitude as was being produced prior to the reception of said predetermined maximum amplitude signal.

3. A circuit according to claim 2 wherein said flip-flop circuit has one pair of output terminals at which said square wave pulses appear.

4. A circuit according to claim 2 wherein said flip-flop circuit has at least two pairs of output terminals, and a means for regulating the voltage between the individual terminals of each of said pairs.

5. A circuit according to claim 4 wherein each said means for regulating voltage comprises first and second Zener diodes disposed with their cathodic terminals connected directly together and their anodic terminals connected, respectively, to the individual terminals of each said pair.

6. A circuit according to claim 1 wherein each said multiplier comprises a diode gate circuit.

7. A circuit for producing a signal representing a seismic coherence measurement by producing a control trace and then multiplying an individual seismic trace by the control trace comprising first means for summing a plurality of angularities of path corrected seismic traces to thereby form a control trace; a signal generator to establish a sawtooth timing signal; means to establish a bias signal second and third means, connected to said first means, for summing (a) said control trace, (b) said sawtooth timing signal, and (c) said bias signal to thus form first and second compound signals; means for inverting the phase of signals applied thereto and disposed between said first means for summing and said third means for summing; first and second pulse width modulators, connected to each of said second and third means, respectively, for receiving said first and second compound signals and for producing spaced timing pulses responsive to these sequential portions of each compound signal which are, respectively, at least equal to a predetermined maximum and minimum amplitude; first and second amplifiers; first and second means for applying the positive and negative components of one seismic trace, respectively, to said first and second amplifiers; first and second means for multiplying the outputs of said amplifiers by the spaced timing pulses from said first and second pulse width modulators, respectively; and a fourth means for summing having the input terminals thereof connected to said first and second means for multiplying.

8. A circuit for producing a signal representing a seismic coherence measurement by producing a control trace and then multiplying an individual seismic trace by the control trace comprising means for producing a control trace; a signal generator for establishing a sawtooth timing signal; first and second means, connected to said means for producing, for receiving and summing (a) said control trace, and (b) said sawtooth timing signal, to thus form first and second compound signals; means for inverting the phase of signals applied thereto and disposed between said means for producing and said second means for summing; first and second pulse width modulators, connected to each of said first and second means for summing, respectively, for receiving said first and second compound signals and for producing spaced timing pulses responsive to these sequential portions of each compound signal which are, respectively, at least equal to a predetermined maximum amplitude and a predetermined minimum amplitude; first and second means for receiving one of said angularities of path corrected seismic trace and dividing it into positive and negative components and then for applying the respective components to one of the hereinafter claimed multipliers; first and second multipliers; means for feeding the spaced timing signals from said first and second pulse width modulators, respectively, to said first and second multipliers, the spaced timing signals fed to each of said multipliers being of the same polarity as the component applied to said multiplier by said means for arbitrarily dividing; and a fourth means for summing having the input terminals thereof connected to receive signals from both said first and second of multipliers.

9. A circuit for producing a signal representing a seismic coherence measurement by producing a control trace and then multiplying an individual seismic trace by the control trace comprising means for producing a control trace; a signal generator for establishing a sawtooth timing signal; first and second means, connected to said first means, for receiving and summing (a) said control trace, and (b) said sawtooth timing signal, to thus form first and second compound signals; means for inverting the phase of signals applied thereto and disposed between said first means for producing and said second means for summing; means for generating and transmitting said sawtooth timing signal to said first and second means for summing; first and second pulse width modulators, connected to each of said first and second means for summing respectively, for receiving said first and second compound signals and for producing spaced timing pulses responsive to these sequential portions of each compound signal which are, respectively, at least equal to a predetermined maximum amplitude and a predetermined minimum amplitude; first and second means for receiving one of said angularities of path corrected seismic traces and dividing it into positive and negative components and then for applying the respective components to the appropriate channels of the hereinafter claimed multipliers; first and second multipliers; means for feeding the spaced timing signals from said first and second pulse width modulators, respectively, to said first and second multipliers; and a fourth means for summing having the input terminals thereof connected to receive signals from both said first and second of multipliers.

10. A circuit for producing a signal representing a seismic coherence measurement by producing a control trace and then multiplying an individual seismic trace by the control trace comprising means for producing a control trace; a signal generator for establishing a sawtooth timing signal; first and second means, connected to said first means, for receiving and summing (a) said control trace, and (b) said sampling signal to thus form first and second compound signals; means for inverting the phase to signals applied thereto and disposed between said first means for producing and said second means for summing; means for generating and transmitting said sampling signal to said first and second means for summing; first and second pulse width modulators, connected to each of said first and second means for summing respectively, for receiving said first and second compound signals and for producing spaced timing pulses responsive to these sequential portions of each compound signal which are, respectively, at least equal to a predetermined maximum amplitude and a predetermined minimum amplitude; first and second means for receiving one of said angularities of path corrected seismic traces and dividing it into positive and negative components and then for applying the respective components to the appropriate channels of the hereinafter claimed multipliers; first and second multipliers; means for feeding the spaced timing signals from said first and second pulse width modulators, respectively, to said first and second multipliers; and a fourth means for summing having the input terminals thereof connected to receive signals from both said first and second of multipliers.

References Cited in the file of this patent

UNITED STATES PATENTS

| | | |
|---|---|---|
| 2,643,819 | Yuk Wing Lee et al. | June 30, 1953 |
| 2,676,206 | Bennett | Apr. 20, 1954 |
| 2,897,477 | Lindsey | July 28, 1959 |
| 2,926,331 | Lindsey | Feb. 23, 1960 |